United States Patent [19]
Grunberg et al.
[11] 3,787,237
[45] Jan. 22, 1974

[54] METHOD OF MAKING A THIN FILM HAVING A HIGH COERCIVE FIELD

[75] Inventors: Georges Grunberg; Igor Melnick, both of Grenoble; Jean Pierre Lazzari, Seyssinet, all of France

[73] Assignee: Commissariat a l'Energie Atomique, Paris, France

[22] Filed: June 22, 1971

[21] Appl. No.: 155,640

Related U.S. Application Data

[63] Continuation of Ser. No. 689,931, Dec. 12, 1967, abandoned.

[30] Foreign Application Priority Data

Dec. 23, 1966 France .............................. 66.88714

[52] U.S. Cl. .................... 117/239, 29/195, 117/240, 117/107

[51] Int. Cl. .............................................. Holf 10/02

[58] Field of Search ....... 117/239, 240, 107; 29/195

[56] References Cited

UNITED STATES PATENTS 3,549,417 12/1970 Judge et al. .................... 117/130 X 3,702,263 11/1972 Hall et al. ...................... 117/130 X

OTHER PUBLICATIONS

Judge et al. Vol. 9, No. 7, Dec. 1966, page 753.

*Primary Examiner*—William D. Martin
*Assistant Examiner*—Bernard D. Pianalto
*Attorney, Agent, or Firm*—Craig, Antonelli & Hill

[57] ABSTRACT

An isotropic thin film having a high coercive field for use as a magnetic memory, and comprising a non-ferromagnetic substrate, at least one chromium layer having a thickness smaller than 10,000 A overlying said substrate and at least one cobalt layer having a thickness smaller than 1,000 A overlying the chromium layer. In a process for the fabrication of the thin film, the chromium layer or layers and the cobalt layer or layers are deposited on the non-ferromagnetic substrate by evaporation under a vacuum.

10 Claims, 6 Drawing Figures

INVENTORS
GEORGES GRUNBERG
JEAN-PIERRE LAZZARI
IGOR MELNICK

BY Craig & Antonelli
ATTORNEYS

INVENTORS
GEORGES GRUNBERG
JEAN-PIERRE LAZZARI
IGOR MELNICK

BY Craig & Antonelli
ATTORNEYS

INVENTORS

GEORGES GRUNBERG
JEAN-PIERRE LAZZARI
IGOR MELNICK

BY

Craig & Antonelli

ATTORNEYS

METHOD OF MAKING A THIN FILM HAVING A HIGH COERCIVE FIELD

This application is a continuation of copending U.S. application Ser. No. 689,931, filed Dec. 12, 1967 and now abandoned, entitled "Thin Film Having a High Coercive Field" by the inventors herein.

This invention relates to a thin film having a high coercive field for use as a magnetic memory as well as to a process for obtaining a film of this type.

Any recording process involves the use of a memory consisting of a physical medium which is capable of acquiring permanent deformation under the direct or indirect influence of the phenomenon to be recorded. One of the physical phenomena which is best suited to the storage of data is the persistence of flux in some magnetic materials: magnetic recording makes use of hysteresis of ferromagnetic materials, that is to say the capacity for retaining residual magnetism or so-called retentivity of such materials which is a function of the magnetic field to which they have been subjected.

The ferromagnetic recording medium moves past in front of a recording head whose function is to transfer the signal to be recorded in the medium in the form of residual magnetism which it is endeavored to make proportional to the instantaneous value of the signal.

Magnetic recording makes it possible to read or, in other words, to restore the electric signal from the recorded medium. In fact, magnetization of the medium can produce a flux in a reading head and when the medium moves in front of the head, the variation in flux generates an electromotive force from which it is possible to reconstitute the initial signal.

Although a large number of magnetic recording devices utilize iron oxide ($\gamma Fe_2O_3$) as magnetic material, the use of chemical and electrolytic coatings is becoming increasingly widespread.

The improvements which are sought in this new direction are primarily concerned with the increase in density, that is to say in capacity, in respect of a given access time. The basic principle of circulating memories entails the need for open-flux memory elements, and the limiting density will be determined by the ratio of the demagnetizing field to the coercive field. Furthermore, in order to attain the requisite standard of maximum resolution, it is necessary to obtain the smallest possible thickness of material which provides a sufficient output signal. This compromise can be achieved with correspondingly greater ease as the saturation induction is higher. It is therefore endeavored to obtain materials having a high coercive field, a rectangular hysteresis loop and of small thickness but possessing a high magnetic moment.

The films which have been formed up to the present time in order to meet the above-mentioned characteristics have many disadvantages. Although coercive fields of 1,000 Oersteds can be obtained, the layers which are formed and which are usually made of alloys often contain oxides which are unstable at high temperature, with the result that memories cannot be employed above 90°. Moreover, such layers are usually fairly friable and the memories are consequently very fragile. Furthermore, the hysteresis loops do not have sufficient rectangularity: the ratio Br/Bs of the residual induction (Br) to the saturation induction (Bs) is usually lower than 0.9. Finally, the layers referred to have in many instances a preferential direction of magnetization (anisotropy) which is related to the needle-type structure of the material.

There have also been proposed "coupled double-layers" made up of two thin films of ferromagnetic alloys (Ni-Fe or Ni-Fe-Co) separated by a film of chromium or palladium. Although it is possible by modifying the composition of the ferromagnetic film and the thickness of the intermediate film to eliminate their preferential magnetization direction, they have a coercive field which scarcely exceeds a value of approximately 20 Oersteds.

The present invention, which is intended to overcome the above-mentioned disadvantages, is directed to thin films which are magnetically isotropic and in which the ratio Br/Bs is comprised between 0.9 and 1 whilst the value of the saturation induction of said films can attain 18,000 gauss and the value of their coercive field attains 1,000 Oersteds.

More particularly, the present invention relates to a thin film with a strong coercive field and a high induction for magnetic memory which comprises a non-ferromagnetic support and overlying said support, several chromium deposits and several cobalt deposits, the chromium deposits alternating with the cobalt deposits, each chromium deposit having the smallest thickness obtainable, and each cobalt deposit having a thickness comprised between the minimum thickness obtainable and 1,000 A. the thickness of each cobalt deposit is advantageously comprised between the minimum thicknesses obtainable and 200 A.

The present invention further relates to a process for making a film of this type, according to which the chromium and the cobalt layers are deposited by evaporation in vacuo at velocities comprised between 10 and 20 A per second for chromium, and between 0.5 and 1 A per second for cobalt.

Further properties and advantages of the invention will become apparent from the description which now follows below and in which one form of execution of the thin film under consideration is given by way of explanation but not in any limiting sense, reference being had to the accompanying drawings, wherein.

Figure 1:
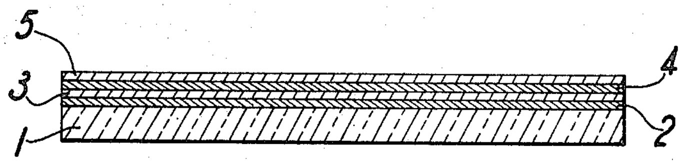
FIG. 1 is a sectional diagram of a magnetic film in accordance with the invention, said film being made up of two layers of cobalt.

The thin magnetic film which is shown by way of example in FIG. 1 is obtained by depositing on a non-ferromagnetic substrate 1 by thermal evaporation in vacuo first a layer 2 of chromium then a layer 3 of cobalt followed by a further layer 4 of chromium, then by a second layer 5 of cobalt. It is possible, of course, to obtain a notably more significant number of alternated stacks of chromium and cobalt layers, with the total number of such layers allowing for an adjustment of the induction of the material, as will become apparent hereinbelow.

The nature of the substrate employed has no influence on the value of the coercive field of the film. This value remains unchanged, whether the substrate is of glass, aluminum or of tantalum. However, in order not to affect the rectangularity of the hysteresis loop, it is preferable to make use of an outgassed substrate which has a good state of surface.

The evaporation is performed under a vacuum, but this condition has only a secondary influence. In fact, experiments carried out in a normal vacuum ($10^{-6}$ torr.) and in an ultra-high vacuum ($10^{-8}$ torr.) have produced practically identical results.

Figure 2:
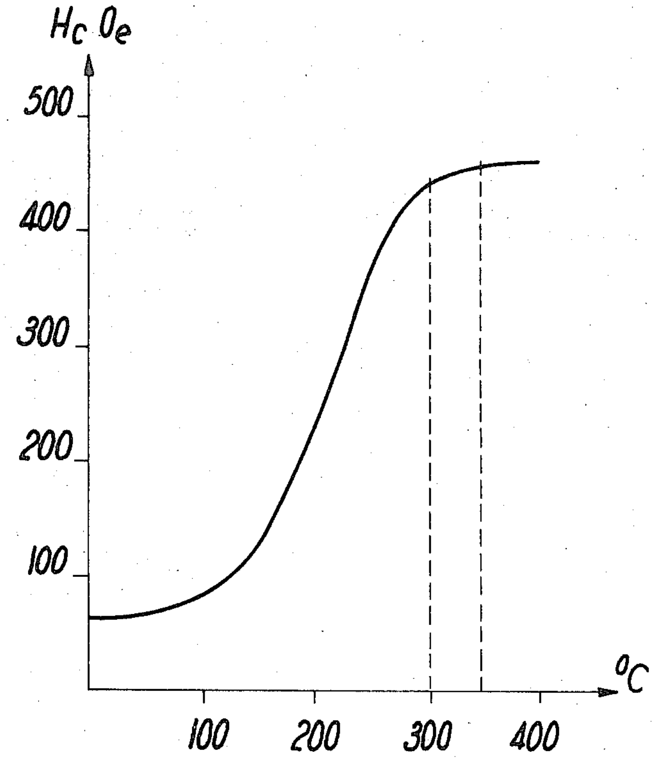
FIG. 2 is a diagram showing the influence of the temperature of the substrate on the coercive field at the time of evaporation of the cobalt.

On the other hand, the conditions of evaporation of the chromium and of the cobalt are of some significance. In particular, the temperature of the substrate at the time of evaporation of the cobalt is an imporatant parameter. As shown in FIG. 2, the coercive field $H_c$ attains its maximum value at approximately 300°C and remains substantially stable thereafter. Moreover, the hysteresis loop exhibits the best rectangularity at 300°C. At the time of evaporation of the cobalt, the temperature must be higher than 250°C and preferably comprised between 300° and 340°C.

Figure 3:
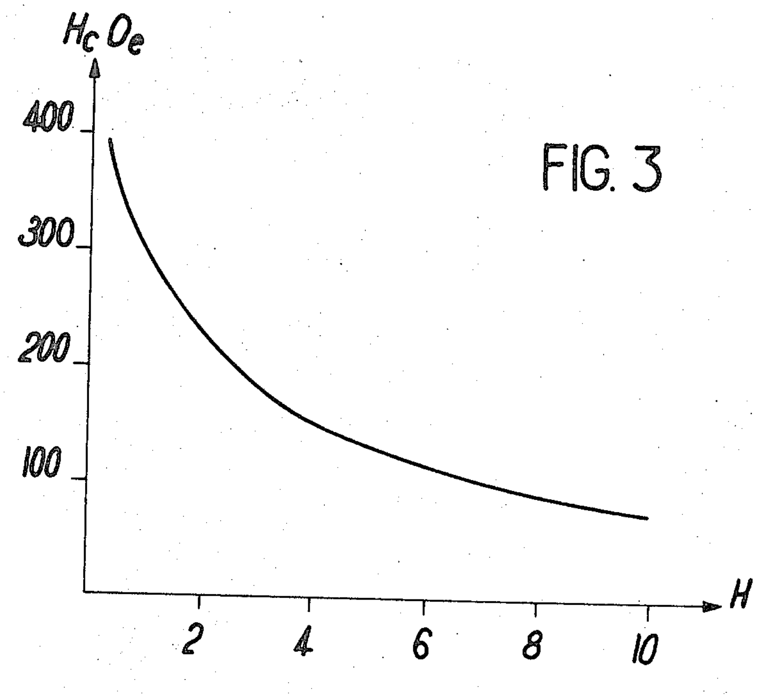
FIG. 3 is a diagram showing the influence on the coercive field of the time which elapses between the deposition of the chromium layer and the deposition of the cobalt layer.

The same must apply to the evaporation of the chromium. In fact, as indicated in FIG. 3, the value of the coercive field decreases fairly rapidly as a function of the time which elapses between the end of the deposition of chromium and the beginning of the deposition of cobalt, so that it it is desired to have a high coercive field, no time interval can be permitted between the two evaporation processes.

The rate of evaporation of the chromium can vary between 10 A/sec. and 20 A/sec. without having any perceptible influence on the size of the crystals. In fact, in order to obtain crystals having different sizes, it would be necessary to increase the evaporation rate to a value higher than 100 A/sec.

Figure 4:
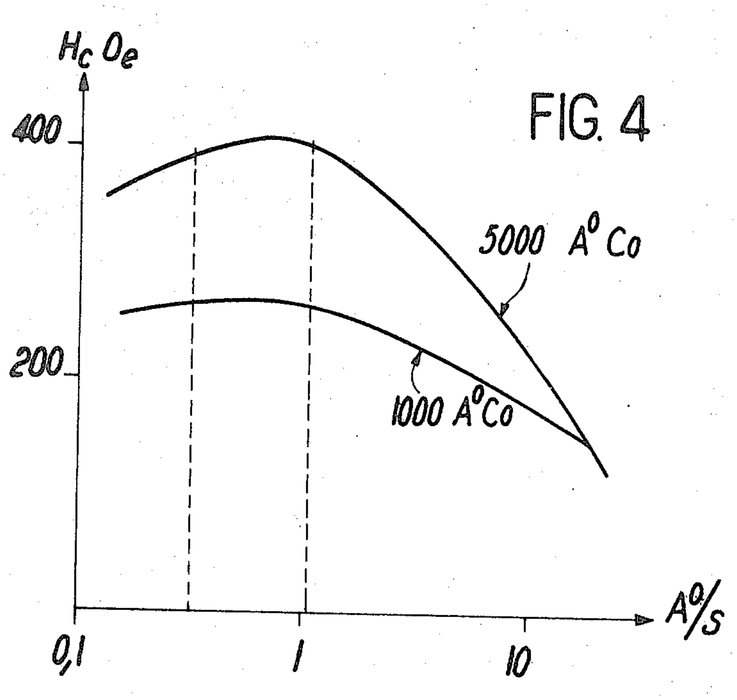
FIG. 4 is a diagram showing the influence of the rate of evaporation of the cobalt on the coercive field.

In the case of cobalt, the evaporation rate is an essential factor for obtaining high coercive fields. In fact, as is apparent from FIG. 4, the coercive field decreases rapidly when said rate becomes higher than 1 A/sec. It is therefore important to ensure that this value is not exceeded and that the evaporation process is performed at a rate which is preferably within the range of 0.5 to 1 A/sec.

Finally, the thickness of the elementary layer of cobalt is also a critical parameter. In fact, it is apparent from FIG. 5 that the coercive field assumes its maximum value in respect of thicknesses of cobalt smaller than 200 A, then decreases and finally stabilizes at 1,400 A at a value of approximately 200 Oe. This thickness, which is also a means of controlling the value of the coercive field to within 10 percent must therefore be smaller than 1,000 A and preferably comprised between the minimum practicable thickness and 200 A.

Furthermore, it has been found that the coercive field of the films made assumes maximum values for the chromium thickness corresponding to the minimum obtainable, i.e., about 50 A.

Figure 5:
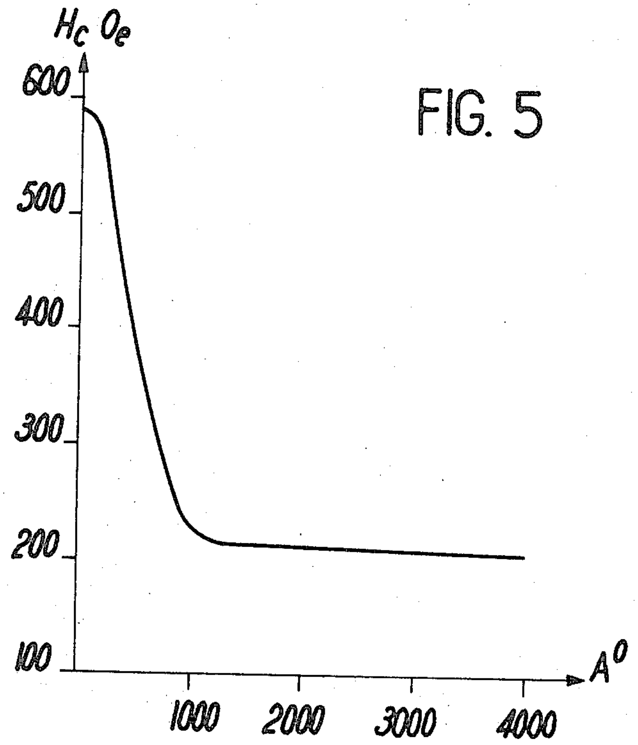
FIG. 5 is a diagram showing the influence of the thickness of cobalt on the coercive field; and finally.

Accordingly, it is evident from the two preceding statements that the highest coercive fields are obtainable with cobalt thicknesses comprised between the minimum obtainable and 1,000 A, and chromium thicknesses of about 50 A. Naturally, the optimum conditions are realized, as shown in FIG. 5, for cobalt thicknesses comprised between the minimum obtainable and 200 A, which corresponds essentially to an ideal value near 100 A, and for chromium thicknesses of 50 A.

Figure 6:
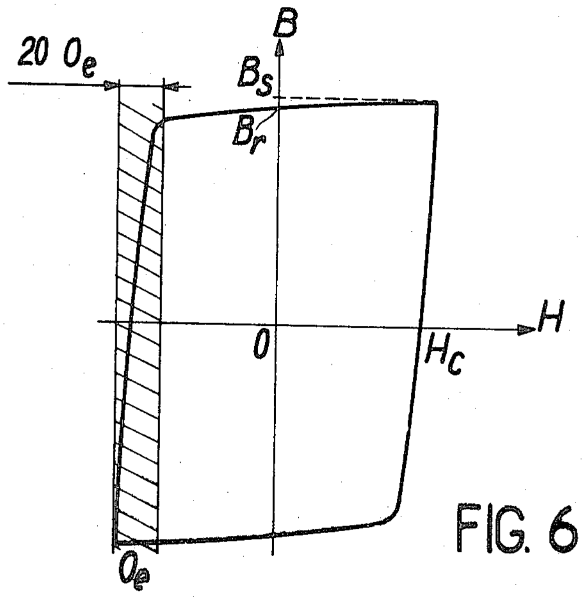
FIG. 6 shows the hysteresis loop of a thin film in accordance with the invention.

It is possible to thus obtain coercive field values close to 1,000 oersteds, and the layers obtained display moreover the essential characteristic of being magnetically isotropic. The hysteresis cycle of a layer according to the present invention, as shown in FIG. 6, displays an excellent rectangularity since, on the one hand, the ratio Br/Bs is higher than 0.9 and, on the other hand, the transition between the opposite magnetization states is generally spread out over about 20 oersteds at the most.

The low thickness of the cobalt deposits in the material according to the present invention does not affect the value of the induction which remains proportional to the total thickness of the cobalt. Thus it is possible to establish the induction of the material by superposition of a number of appropriate layers, with the coercive field remaining that of the elementary chromium-cobalt layer. By virtue of the strong induction of cobalt which is found pure and not linked to another constituent, the films obtained have saturation inductions which reach 18,000 gauss. By way of comparison, as is known, the cobalt oxides which are generally utilized in the prior art have a saturation induction close to 5,000 gauss, which forces one to very significantly increase the quantity of material with damage to the resolution of the memories obtained.

It is readily apparent that the present invention has been described above by way of explanation but not in any sense by way of limitation and that any detail modifications may be contemplated without thereby departing either from the scope or the spirit of the invention.

We claim:

1. A process for producing an isotropic thin film for use as a magnetic memory having a coercive field up to 1,000 oersteds, a Br/Bs ratio of from 0.9 to 1 and a saturation inductance up to 18,000 gauss which comprises heating a non-ferromagnetic substrate to a temperature greater than 250°C. and coating said substrate, alternatively, with at least one chromium layer and at least one cobalt layer, said cobalt layer being applied immediately after application of said chromium layer, the chromium layer having a thickness from the minimum practicable to 10,000 A and the cobalt layer having a thickness from the minimum practicable to 1,000 A, said layers being formed by evaporation under a vacuum; the rate of chromium deposition being less than 100 A/sec. and the rate of cobalt deposition being up to 1 A/sec.

2. The process according to claim 1, wherein a plurality of chromium layers and a plurality of cobalt layers are alternately coated on said substrate, each of said chromium layers being arranged alternately with each of said cobalt layers.

3. The process according to claim 1, wherein the respective deposition rates of said layers are between 10 and 20 A per second and between 0.5 and 1 A per second.

4. The process according to claim 1, wherein the rate of cobalt deposition is lower than 1 A/sec.

5. The process according to claim 1, wherein the temperature of the substrate at the time of evaporation of the cobalt is within the range of 300° to 340°C.

6. The process of claim 1, wherein the rate of chromium deposition is about 10 to 20 A/sec.

7. The process of claim 1, wherein the rate of cobalt deposition is about 0.5 to 1 A/sec.

8. The process of claim 1, wherein each cobalt layer has a thickness less than 200 A.

9. The process of claim 1, wherein each chromium layer has a thickness of about 50 to 10,000 A.

10. The process of claim 1, wherein the thickness of the cobalt layer is about double the thickness of the chromium layer.

* * * * *